(12) United States Patent
Nakano et al.

(10) Patent No.: US 7,353,385 B2
(45) Date of Patent: Apr. 1, 2008

(54) AUTHENTICATION SYSTEM, AUTHENTICATION METHOD, AUTHENTICATION APPARATUS, AND AUTHENTICATION METHOD THEREFOR

(75) Inventors: Tomoyuki Nakano, Kanagawa (JP); Tatsuo Itabashi, Tokyo (JP)

(73) Assignee: Sony Corporation, Tokyo (JP)

( * ) Notice: Subject to any disclaimer, the term of this patent is extended or adjusted under 35 U.S.C. 154(b) by 765 days.

(21) Appl. No.: 09/846,522

(22) Filed: Apr. 30, 2001

(65) Prior Publication Data

US 2002/0032858 A1   Mar. 14, 2002

(30) Foreign Application Priority Data

Apr. 28, 2000  (JP) ............................ P2000-131872

(51) Int. Cl.
*H04L 9/00* (2006.01)
*H04L 9/32* (2006.01)
*H04L 12/22* (2006.01)

(52) U.S. Cl. ...................... 713/159; 713/155; 713/159; 713/168; 713/172; 713/182; 380/282; 380/285; 726/20

(58) Field of Classification Search ................ 713/185, 713/200, 201, 159, 155, 168, 172, 182; 705/139; 380/21, 282, 285; 726/20
See application file for complete search history.

(56) References Cited

U.S. PATENT DOCUMENTS 4,771,460 A * 9/1988 Tamada et al. ................ 705/65
5,017,766 A * 5/1991 Tamada et al. ............. 235/492
5,577,121 A * 11/1996 Davis et al. .................. 705/67
5,602,918 A    2/1997 Chen et al.
6,076,164 A    6/2000 Tanaka et al.
6,138,107 A * 10/2000 Elgamal ....................... 705/39
6,243,812 B1 * 6/2001 Matyas et al. .............. 713/172
6,282,656 B1 * 8/2001 Wang ............................. 726/4
6,694,436 B1 * 2/2004 Audebert .................... 713/200
6,751,733 B1 * 6/2004 Nakamura et al. .......... 713/182
6,971,008 B2 * 11/2005 Wasilewski et al. ........ 713/168
6,990,588 B1 * 1/2006 Yasukura .................... 713/186

FOREIGN PATENT DOCUMENTS

| EP | 0 725 512 | | 8/1996 |
| GB | 2261538 A | * | 5/1993 |
| GB | 2 318 486 | | 4/1998 |
| WO | WO 98/40982 | | 9/1998 |

OTHER PUBLICATIONS

"http://www/arcelect.com/pcmia.htm"; published Jan. 12, 1998 and printed from desktop Sep. 1, 2005.*

* cited by examiner

*Primary Examiner*—Carl Colin
(74) *Attorney, Agent, or Firm*—Bell, Boyd & Lloyd LLP

(57) ABSTRACT

An information holding medium stores the common key of the user used in the common-key encryption method. In response to a user authentication request sent from an information processing apparatus, the user is authenticated by the common-key encryption method by using the common key stored in the information holding medium of the user. Only when the user has been authenticated, predetermined processing for making the information processing apparatus authenticate the user by the public-key encryption method is performed.

23 Claims, 13 Drawing Sheets

| USER ID | COMMON KEY FOR IC CARD |
|---|---|
| 0001 | XXXXXXXXXXX |
| 0002 | XXXXXXXXXXX |
| 0003 | XXXXXXXXXXX |
| ⋮ | ⋮ |

| USER ID 57 | CERTIFICATE 58 | PRIVATE KEY 59 |
|---|---|---|
| 0001 | CERTIFICATE CORRESPONDING TO USER ID 0001 | XXXXXXXXXXX |
| 0002 | CERTIFICATE CORRESPONDING TO USER ID 0002 | XXXXXXXXXXX |
| 0003 | CERTIFICATE CORRESPONDING TO USER ID 0003 | XXXXXXXXXXX |
| ⋮ | ⋮ | ⋮ |

FIG. 11

CERTIFICATE SERIAL NUMBER : 123456789
EXPIRATION DATE : 2001/12/31
USER ID : 0001
PUBLIC KEY : XXXXXXXXXXXXX
E-MAIL : taro@somedomein.com
CONTACT INFORMATION :
    XXX CITY, YYY PREFECTURE, JAPAN

SIGNATURE OF CERTIFICATION AUTHORITY

AUTHENTICATION SYSTEM, AUTHENTICATION METHOD, AUTHENTICATION APPARATUS, AND AUTHENTICATION METHOD THEREFOR

BACKGROUND OF THE INVENTION

1. Field of the Invention

The present invention relates to authentication systems, authentication methods, authentication apparatuses, and authentication methods therefor, and more particularly, to an authentication apparatus which efficiently uses advantages of different types of encryption methods to perform encryption.

2. Description of the Prior Art

As authentication and signature methods in authentication systems, there have been conventionally used a common-key encryption method and a public-key encryption method.

In the common-key encryption method, one encryption key called a common key is used and information encrypted by the common key is decrypted by the same common key. Since the common-key encryption method performs encryption and decryption within a short period, it is used in cases where information which requires high-speed processing is processed, such as electronic money or commuter-pass information stored in an IC card.

In the public-key encryption method, two encryption keys called a public key and a private key are used, and information encrypted by one encryption key is decrypted by the other encryption key. The public-key encryption method has a higher safety in terms of information leakage but has a lower processing speed than the common-key encryption method, and is used in cases where anonymity is required, such as a case in which a financial transaction is achieved on a network, such as the Internet.

When the public-key encryption method is used, an IC card stores a certificate for certifying the user who uses the IC card and a public key, and is used as an encryption module.

Depending on fields to which authentication systems are applied, the common-key encryption method or the public-key encryption method is used.

It has been demanded these days, however, that an encryption method be created which has both safety provided by the public-key encryption method and quickness provided by the common-key encryption method, in order to allow one IC card to enable efficient authentication and a financial transaction.

Authentication systems have the ability to check the legitimacy of a certificate stored in an IC card, but do not have the ability to check whether the IC card is actually used legitimately.

In authentication systems, if an IC card is lost, since procedures for authentication and a financial transaction by the use of the IC card is stopped according to a certificate invalidation list periodically issued from a certification authority provided on a network, the use of the IC card performed real time at any points on the network cannot be stopped immediately.

SUMMARY OF THE INVENTION

The present invention has been made in consideration of the foregoing points. It is an object of the present invention to provide an authentication system, an authentication method, an authentication apparatus, and an authentication method therefor which has improved safety and quickness for authentication.

The foregoing object is achieved in one embodiment of the present invention through the provision of a user authentication system including a data holding medium for holding the common key unique to a user, used in the common-key encryption method; an authentication apparatus for holding the common key used in the common-key encryption method and the private key used in the public-key encryption method, each unique to the user; and an information processing apparatus connected to the authentication apparatus in an always-communicable manner and provided with a function for performing authentication by the public-key encryption method; wherein the authentication apparatus performs authentication by using the common key held by the data holding medium and the common key held by the authentication apparatus, in response to a user authentication request sent from the information processing apparatus, and only when the user has been authenticated, performs processing for making the information processing apparatus authenticate the user by using the private key corresponding to the user. As a result, according to this authentication system, user authentication is performed with safety provided by the public-key encryption method and quickness provided by the common-key encryption method.

The foregoing object is achieved in another aspect of the present invention through the provision of a user authentication method for a user who carries a data holding apparatus for holding a common key used in the common-key encryption method, including a step of authenticating the user by the common-key encryption method by using the common key held by the data holding apparatus of the user in response to a user authentication request; and a step of, only when the user has been authenticated, performing processing for authenticating the user by the public-key encryption method. As a result, according to this authentication method, user authentication is performed with safety provided by the public-key encryption method and quickness provided by the common-key encryption method.

The foregoing object is achieved in still another aspect of the present invention through the provision of an authentication method including a step of holding a common key used in the common-key encryption method and a private key used in the public-key encryption method, for each user; an authentication step of, in response to a user authentication request sent from an external information processing apparatus, authenticating the user by using the held common key for the user and a common key used in the common-key encryption method which the user has and is held by a data holding apparatus; and a step of, only when the user has been authenticated in the authentication step, performing processing for making the information processing apparatus authenticate the user by the public-key encryption method by using the private key corresponding to the user. As a result, according to this authentication method, user authentication is performed with safety provided by the public-key encryption method and quickness provided by the common-key encryption method.

The foregoing object is achieved in yet another aspect of the present invention through the provision of an authentication apparatus including a holder for holding a common key used in the common-key encryption method and a public key used in the public-key encryption method, for each user; and an authenticating device which, in response to a user authentication request sent from an external information processing apparatus, authenticates the user by using the common key for the user held by the holder and a common key used in the common-key encryption method for the user held by a data holding medium of the user, and for, only when the user has been authenticated, performing processing for making the information processing apparatus authenticate the user by the public-key encryption method by using the private key corresponding to the user. As a result, according to this authentication apparatus, user authentication is performed with safety provided by the public-key encryption method and quickness provided by the common-key encryption method.

As described above, according to the present invention, an information holding medium stores the common key of the user used in the common-key encryption method, and, in response to a user authentication request sent from an information processing apparatus, the user is authenticated by the common-key encryption method by using the common key stored in the information holding medium of the user. Only when the user has been authenticated, predetermined processing for making the information processing apparatus authenticate the user by the public-key encryption method is performed. Therefore, user authentication provided with quickness given by the common-key encryption method and safety given by the public-key encryption method is performed. Thus, an authentication system, an authentication method, an authentication apparatus, and a method therefor which have improved safety and quickness for authentication are provided.

Additional features and advantages of the present invention are described in, and will be apparent from, the Detailed Description of the Preferred Embodiments and the Drawings

DESCRIPTION OF THE DRAWINGS

FIG. 11 is an outlined view showing the structure of a certificate;

DETAILED DESCRIPTION OF THE PREFERRED EMBODIMENTS

Figure 1:
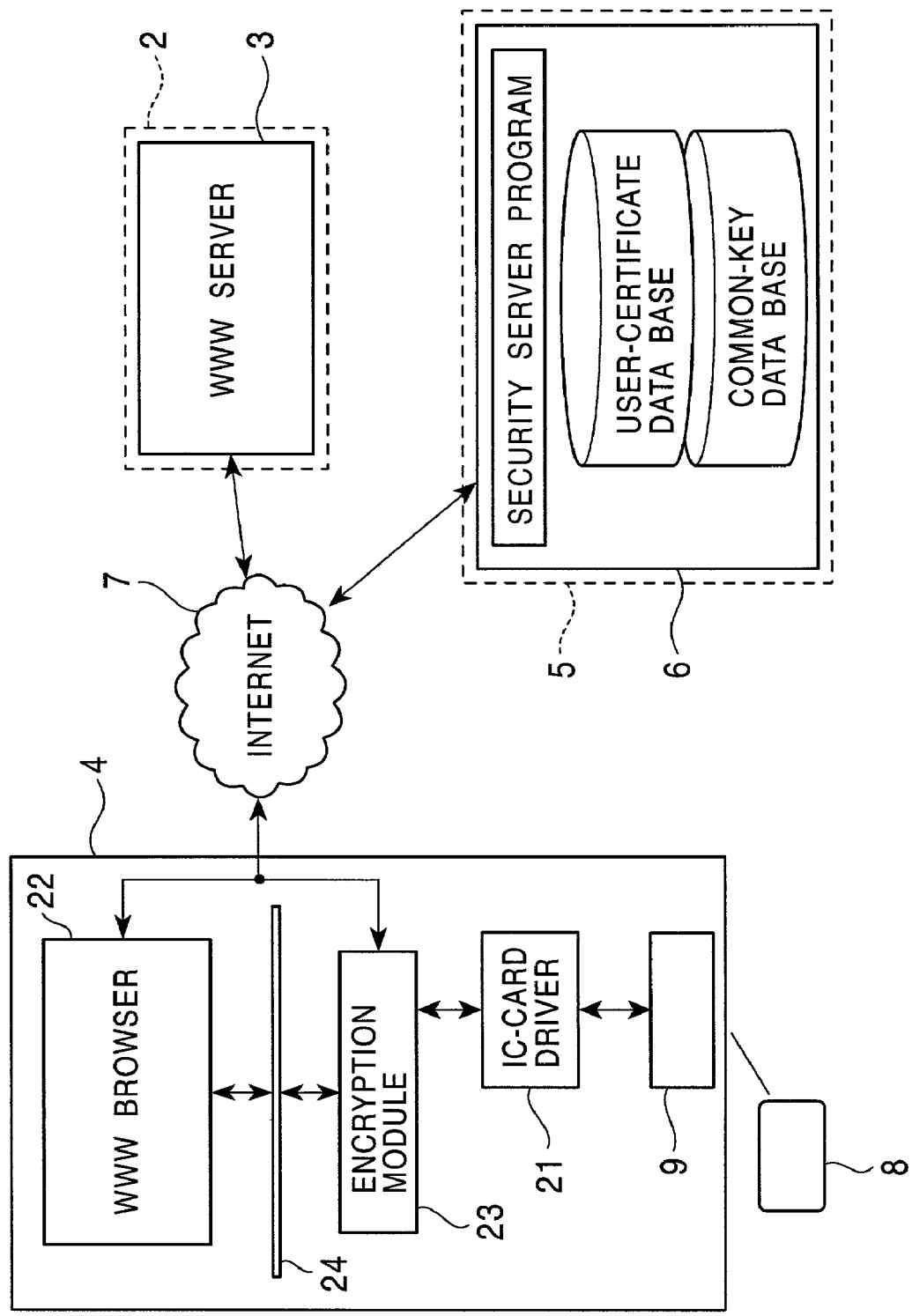
FIG. 1 is an outlined view showing the structure of a network system according to an embodiment of the present invention.

An embodiment of the present invention will be described below in detail by referring to the drawings.

(1) Structure of a Network System According to an Embodiment

FIG. 1 shows a network system 1 according to an embodiment of the present invention as a whole. The network system 1 is formed of a world-wide-web (WWW) server 3 installed in a service provider 2, a user terminal 4, and a security server 6 installed in an authentication center 5 all of which are connected via the Internet 7.

Figure 2:
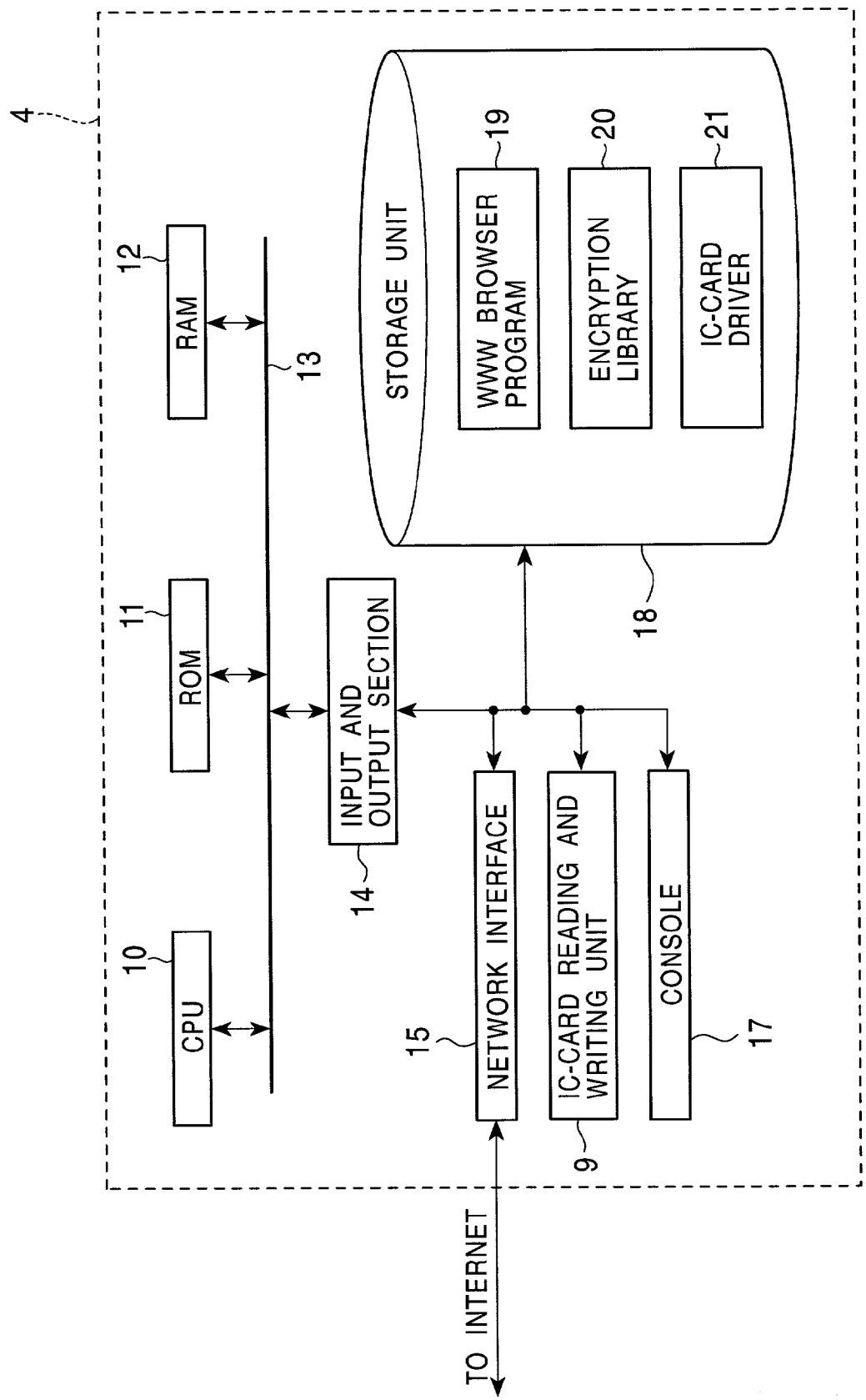
FIG. 2 is a block diagram showing the structure of a user terminal.

The user terminal 4 is a general personal computer, as shown in FIG. 2, in which a central processing unit (CPU) 10, a read only memory (ROM) 11 storing programs for executing various types of processing, such as that described later, a random access memory (RAM) 12 serving as a work memory for the CPU 10, and an input and output section 14 serving as an input and output interface are connected via a bus 13, and a network interface 15 formed of a modem, an IC-card reading and writing unit 9, a console 17 formed of a keyboard, a monitor, a mouse, and the like, and a storage unit 18 formed of a hard disk unit are connected to the input and output section 14.

The storage unit 18 stores a WWW browser program 19, an encryption library 20 formed of programs which manage encryption according to the common-key encryption method and the public-key encryption method, and an IC card driver 21 for the IC-card reading and writing unit 9.

When the CPU 10 develops the WWW browser program 19 stored in the storage unit 18, on the RAM 12 and executes it, the CPU 10 functions as a WWW browser 22 (FIG. 1) and is allowed to send and receive information on the Internet 7 through the network interface 15.

When the CPU 10 develops a program of the encryption library 20 stored in the storage unit 18, on the RAM 12 and executes it, the CPU 10 functions as an encryption module 23 (FIG. 1) to manage encryption.

Between the WWW browser 22 and the encryption module 23, an application program interface (API), such as that conforming to a public-key cryptography standard #11 (PKCS #11)-24 standard provided by RSA, is provided to make information exchange easy between the WWW browser 22 and the encryption module 23.

In addition, the CPU 10 develops the IC-card driver 21 on the RAM 12 and executes it to operate the IC-card reading and writing unit 9.

The IC-card reading and writing unit 9 is provided with a radio function conforming, for example, to a Bluetooth standard to send information read from an IC card 8 by radio to the storage unit 18 and to write information received from the storage unit 18 into the IC card 8 by radio.

Figure 3:
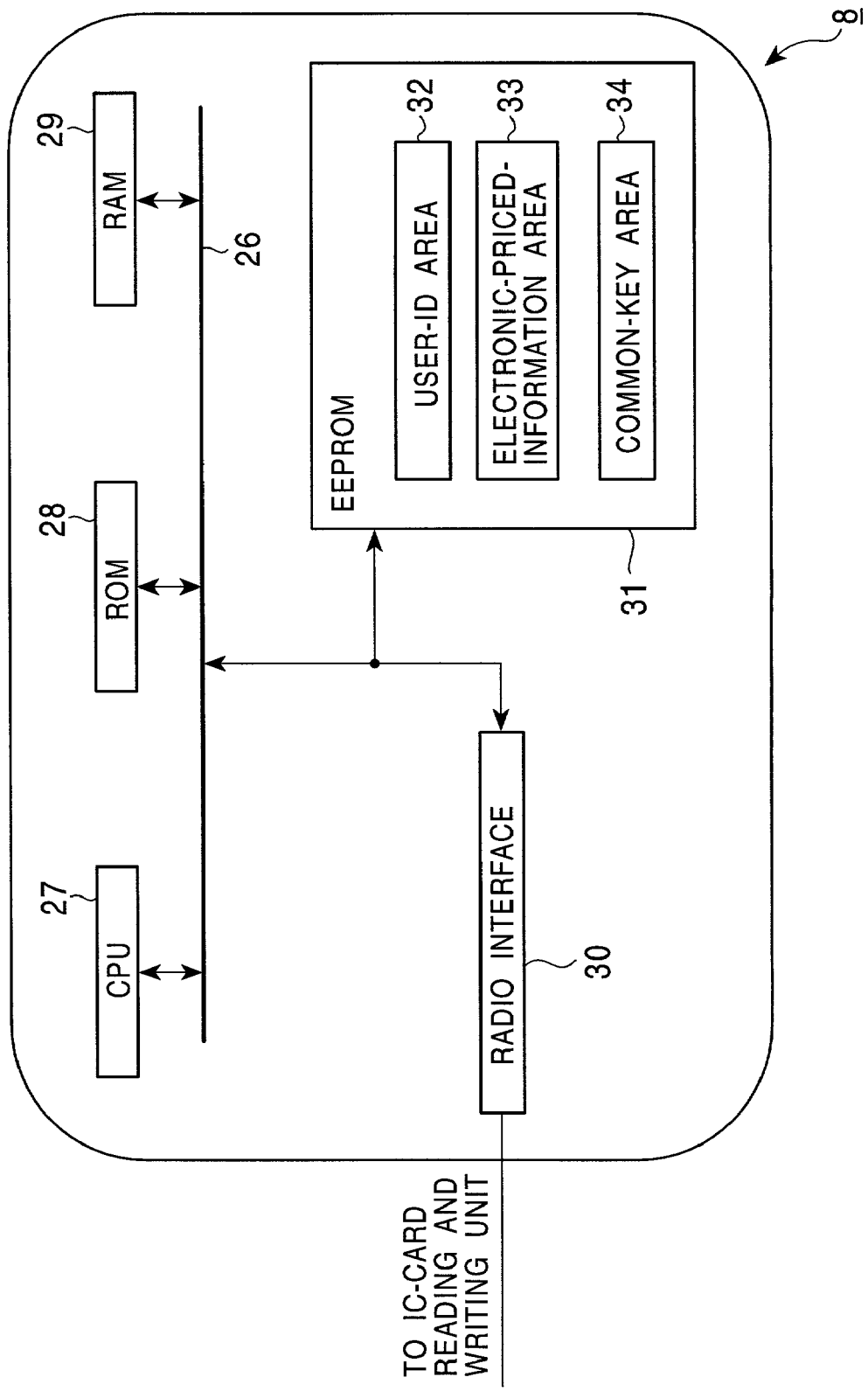
FIG. 3 is a block diagram showing the structure of an IC card.

The IC card 8 is formed, as shown in FIG. 3, of a CPU 27, a ROM 28, a RAM 29, a radio-communication interface 30 for radio communication with the IC-card reading and writing unit 9, and an electrically erasable programmable ROM (EEPROM) 31 which stores various types of information, such as a user ID assigned to the IC card 8, all of which are connected via a bus 26.

The EEPROM 31 has a user-ID area 32, an electronic-priced-information area 33, and a common-key area 34. A user ID, electronic priced information, and a common key for allowing an external access to be made to the user-ID area 32 and the electronic-priced-information area 33 are written into the corresponding areas.

The CPU 27 develops an encryption processing program stored in the ROM 28, on the RAM 29 and executes it to decrypt information (hereinafter called common-key-encrypted information) encrypted by a common key obtained through the radio interface 30, by using the common key read from the EEPROM 31.

When the common-key-encrypted information is successfully decrypted by using the common key read from the EEPROM 31, the CPU 27 permits access to each area of the EEPROM 31, and, for example, writes electronic priced information obtained through the radio interface 30 into the electronic-priced-information area 33 of the EEPROM 31.

Figure 4:
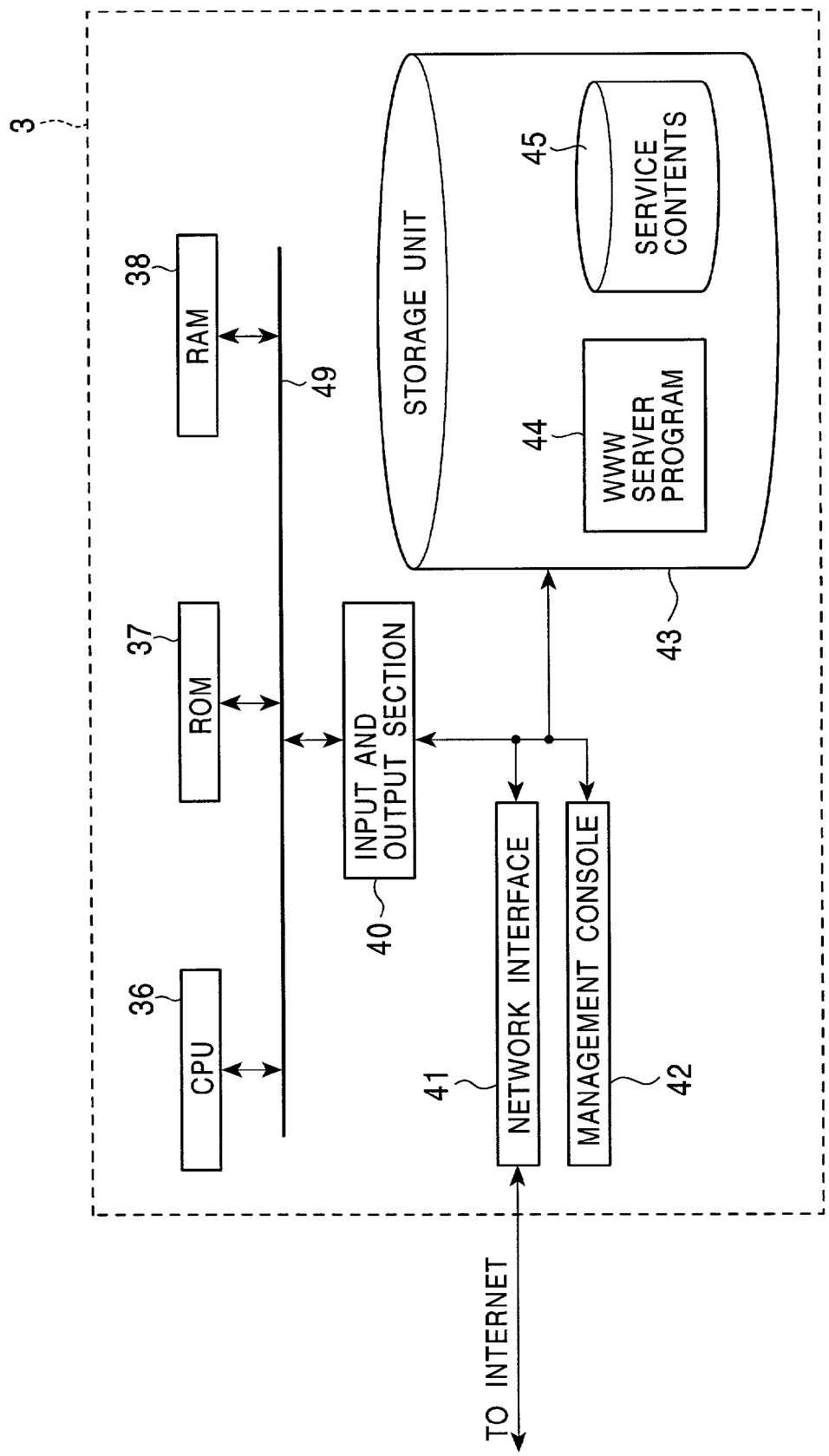
FIG. 4 is a block diagram showing the structure of a WWW server.

The WWW server 3 installed in the service provider 2 is formed, as shown in FIG. 4, of a CPU 36, a ROM 37, a RAM 38, and an input and output section 40, all of which are connected via a bus 39, and a network interface 41 formed of a router for connecting the input and output section 40 to the Internet 7, a management console 42 formed of a keyboard, a monitor, a mouse, and the like, and a storage unit 43, all of which are connected. The storage unit 43 stores a WWW server program 44 and service contents 45, such as electronic priced information.

When the CPU 36 develops the WWW server program 44 stored in the storage unit 43 on the RAM 38 and executes it, the CPU 36 functions as the WWW server 3 (FIG. 1) and is allowed to offer the service contents 45 through the network interface 41.

Figure 5:
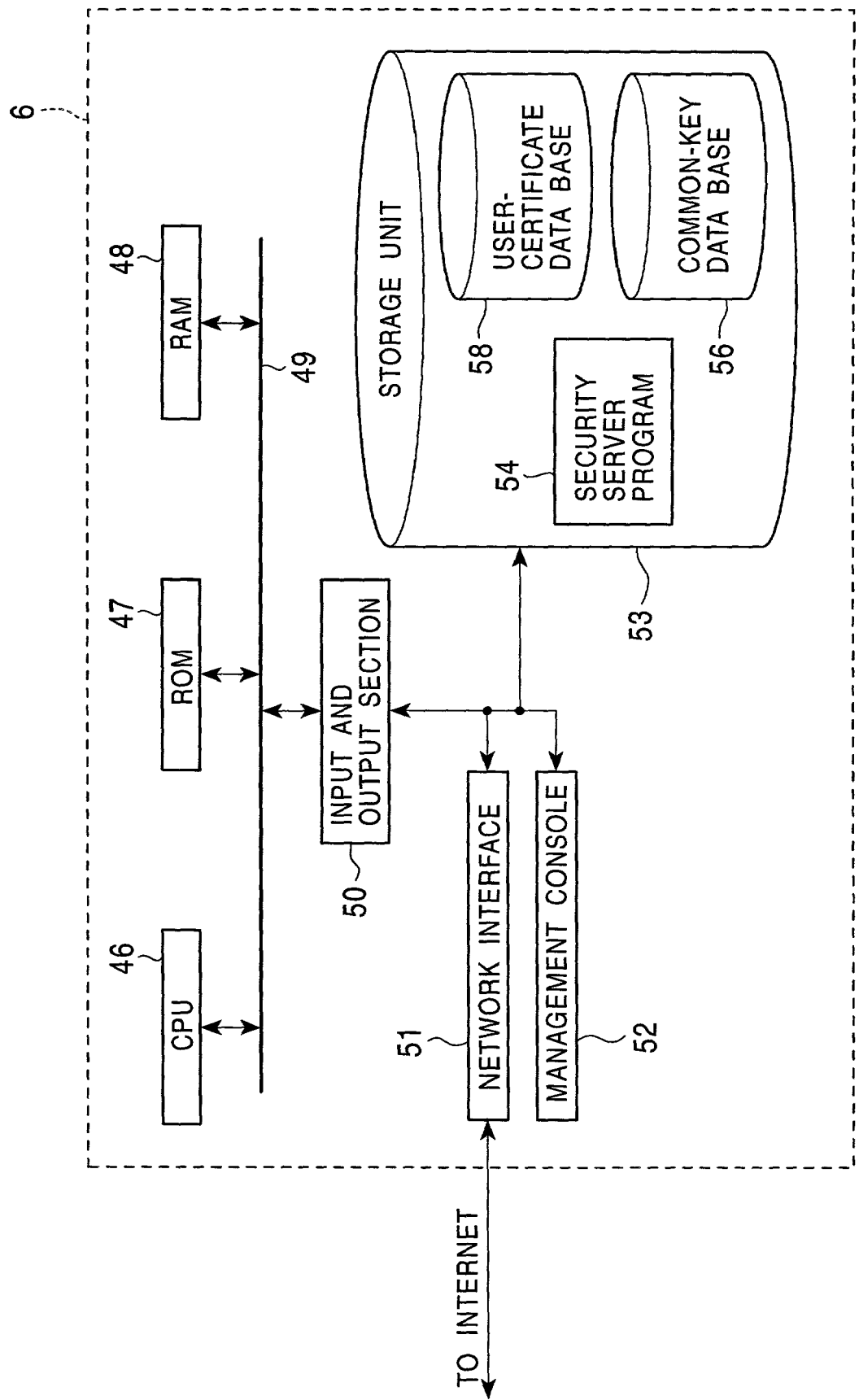
FIG. 5 is a block diagram showing the structure of a security server.

In contrast, the security server 6 installed in the authentication center 5 is formed, as shown in FIG. 5, of a CPU 46, a ROM 47, a RAM 48, and an input and output section 50, all of which are connected via a bus 49, and a network interface 51 formed of a router for connecting the input and output section 50 to the Internet 7, a management console 52 formed of a keyboard, a monitor, a mouse, and the like, and a storage unit 53, all of which are connected. The storage unit 53 stores a security server program 54, a user-certificate data base 55, described later, and a common-key data base 56, described later.

When the CPU 46 of the security server 6 develops the security server program 54 stored in the storage unit 53 on the RAM 48 and executes it, the CPU 46 functions as the security server 6.

(2) Authentication Procedures

Figure 6:
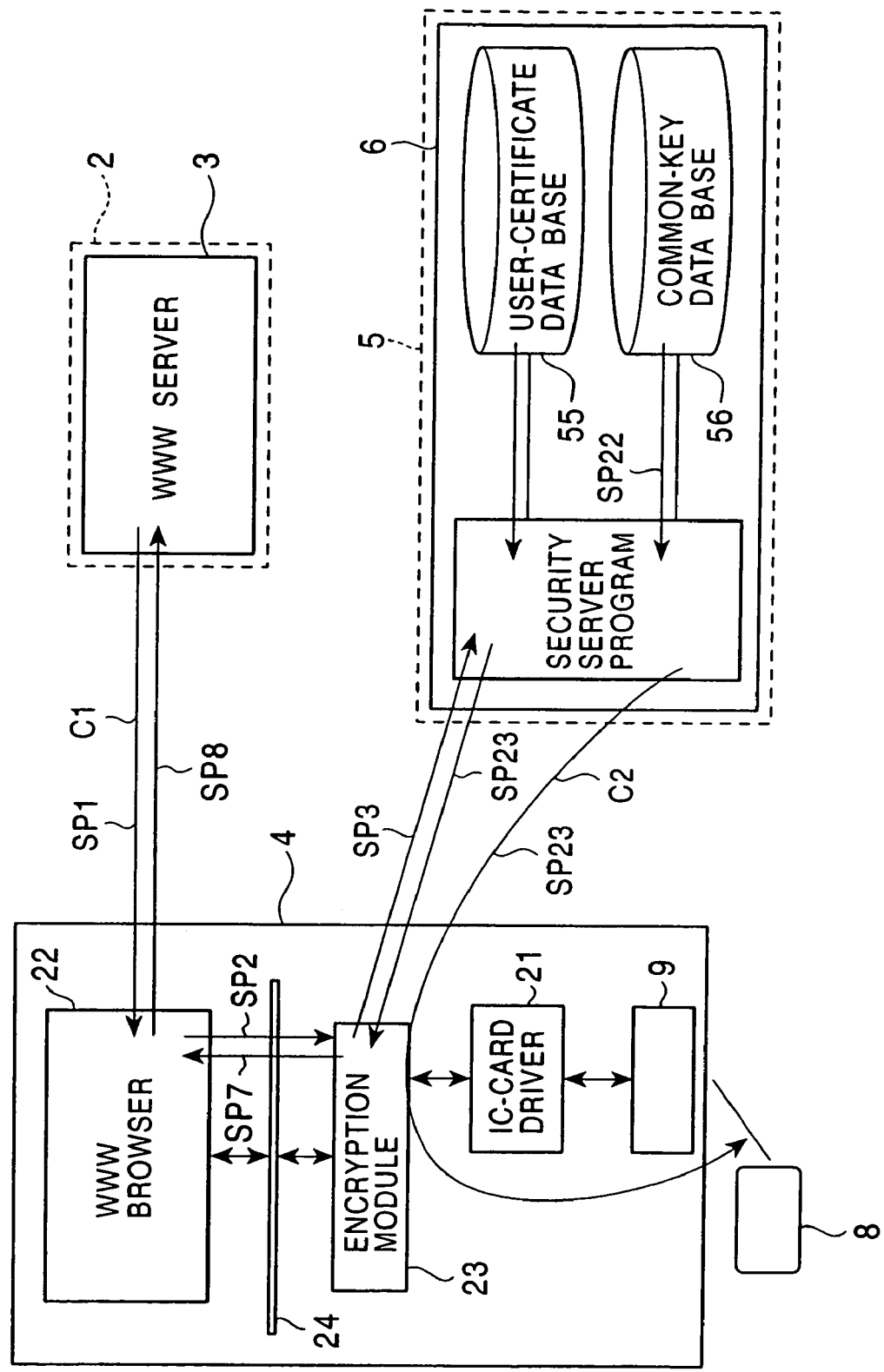
FIG. 6 is an outlined view showing authentication.
Figure 7:
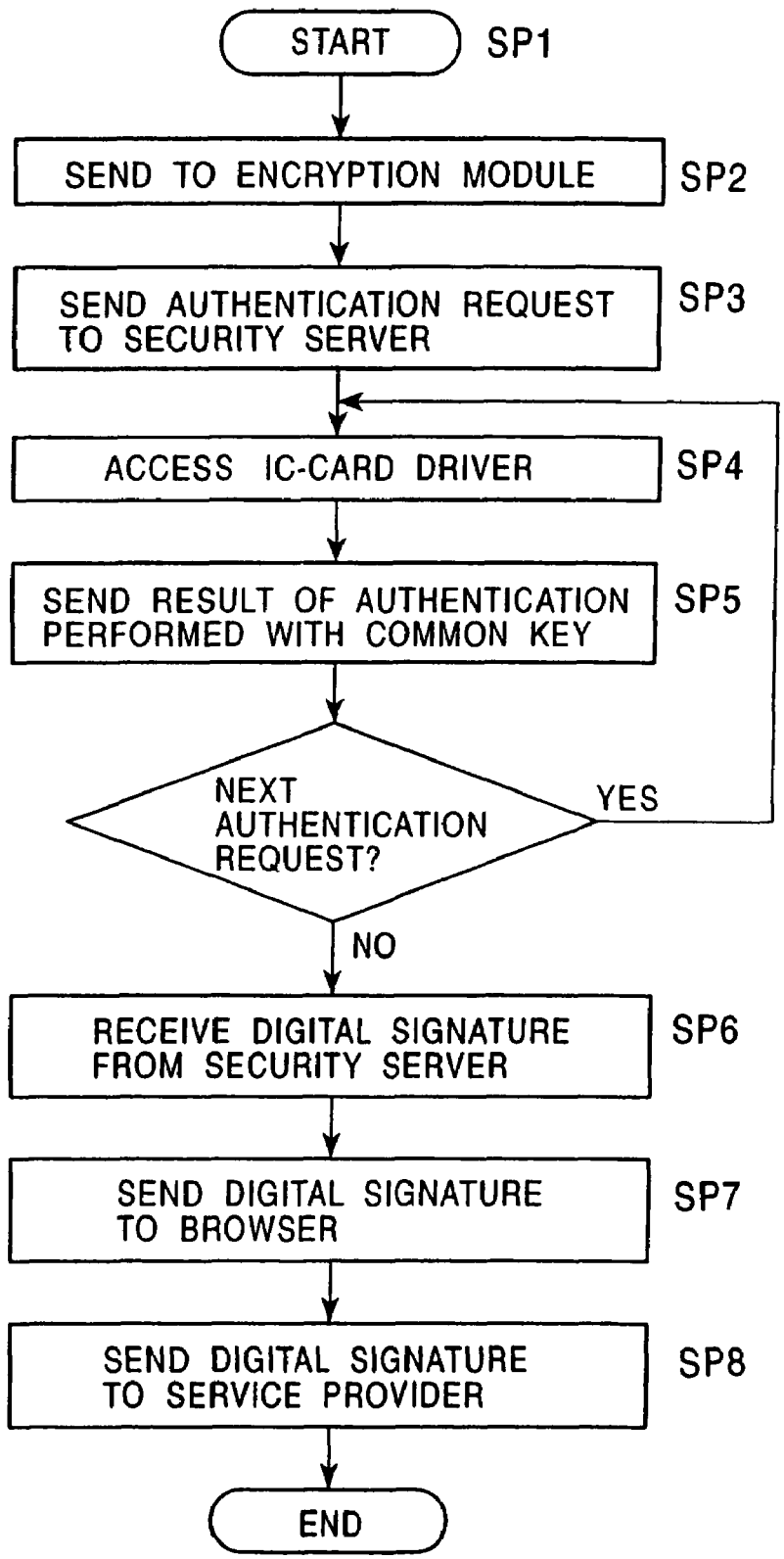
FIG. 7 is a flowchart of an authentication procedure achieved by the user terminal.
Figure 8:
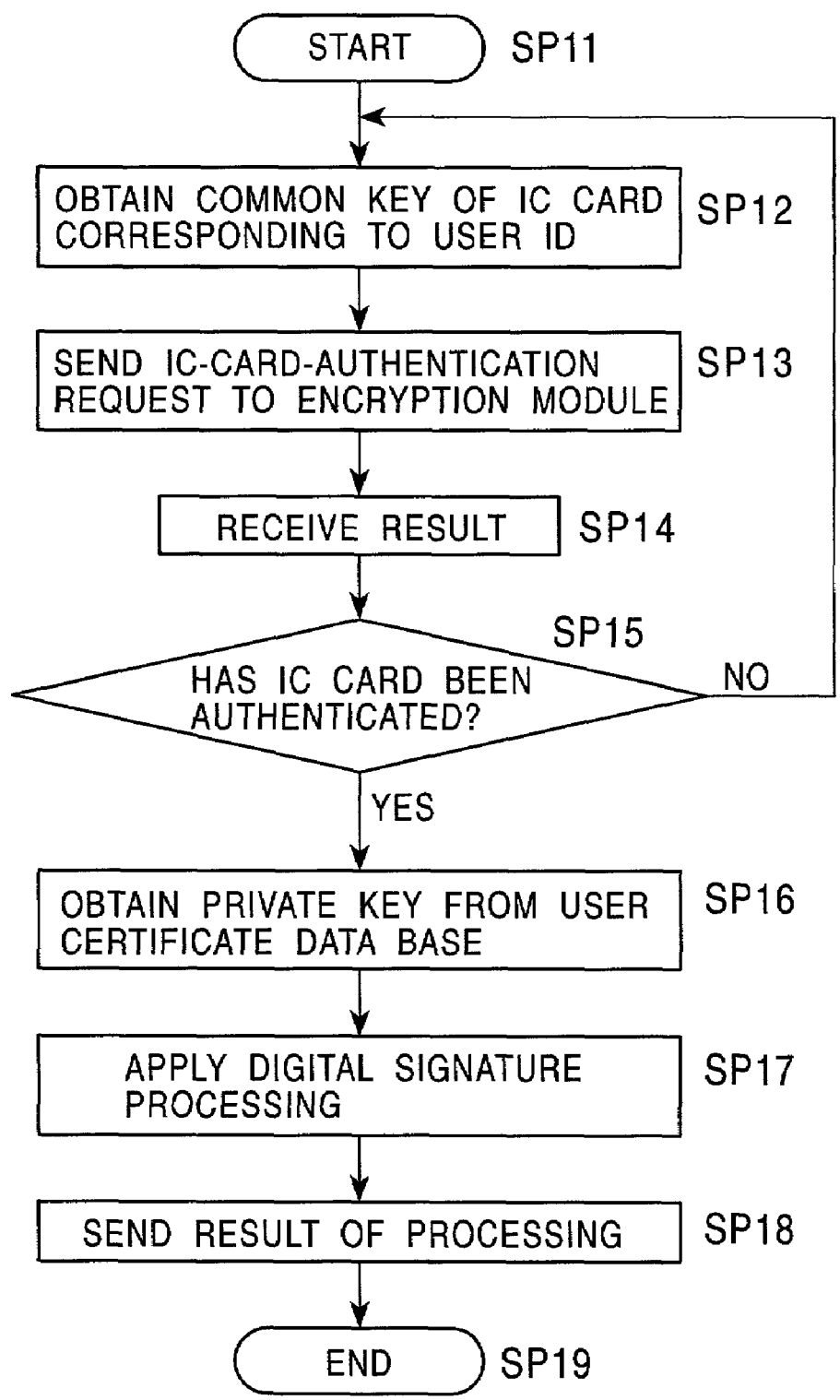
FIG. 8 is a flowchart of an authentication procedure achieved by the security server.

In the network system 1, as shown in FIG. 6, the user terminal 4 performs authentication according to an authentication procedure RT1 for authenticating itself shown in FIG. 7 and the security server 6 authenticates the user terminal 4 according to an authentication procedure RT2 shown in FIG. 8, so that the user terminal 4 proves the legitimacy of itself to the WWW server 3, which provides electronic priced information.

In this case, the user terminal 4 first operates the WWW browser 22 to request the WWW server 3 to send electronic priced information to the user terminal 4.

The WWW server 3 generates trial characters formed of a random character string, and then sends an authentication request command C1 for authenticating the user terminal 4 in order to check the legitimacy of the information request source, together with the generated trial characters to the user terminal 4.

When the CPU 10 of the user terminal 4 receives the authentication request command C1, the CPU 10 starts the authentication procedure RT1 (in step SP1), and sends the received authentication request command C1 and the trial characters to the encryption module 23 (in step S2).

Then, the CPU 10 reads a user ID from the IC card 8 through the IC-card reading and writing unit 9, and sends the authentication request command C1 and the trial characters received by the encryption module 23, to the security server 6 together with the read user ID (in step S3).

Figure 9:
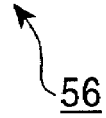
FIG. 9 is an outlined view showing the structure of a common-key data base.

When the CPU 46 of the security server 6 receives the authentication request command C1, the CPU 46 starts the authentication procedure RT2 (in step SP11), reads the common key corresponding to the received user ID from the common-key data base 56 shown in FIG. 9, stored in the storage unit 53 (in step SP12), and generates common-key encrypted information by the use of the read common key. Then, the CPU 46 sends an IC-card authentication request command C2 together with the common-key-encrypted information to the encryption module 23 of the user terminal 4 (in step SP23).

Figure 10:
FIG. 10 is an outlined view showing the structure of a user-certificate data base.

The CPU 46 reads the certificate 58 corresponding to the user ID from the user-certificate data base 55 shown in FIG. 10, stored in the storage unit 53, and sends it in advance to the encryption module 23 of the user terminal 4 and to the WWW server 3 through the WWW browser 22.

In the certificate 58, if it is, for example, for a user ID 0001, information is written such as a certificate serial number, expiration-date information of the certificate, the user ID, a public key generated as a pair with the private key, an electronic-mail address, and the contact information of the user, as shown in FIG. 11. In addition, the certificate 58 includes a digital signature of a certification authority which generates the private key and the public key (hereinafter, a pair of these keys is called encryption keys) to assure the legitimacy of the certificate 58.

When the encryption module 23 receives the IC-card authentication request command and the common key, the CPU 10 of the user terminal 4 activates the IC-card driver 21 to operate the IC-card reading and writing unit 9 (in step SP5) to send the IC-card authentication request command C2 and the common-key-encrypted information to the IC card 8 through the IC-card reading and writing unit 9.

When the IC card 8 receives the IC-card authentication request command C2, the IC card 8 authenticates (decrypts) the common-key-encrypted information by the common key stored in the EEPROM 31 provided inside, and sends the result of authentication to the security server 6 through the encryption module 23 (in step SP5).

When the CPU 46 of the security server 6 confirms (in step SP15) from the received result of authentication that the IC card 8 has been successfully authenticated, the CPU 46 obtains the private key corresponding to the user ID (in step SP16) from the user-certificate data base 55 (FIG. 6) in response to the authentication request sent from the WWW server 3, generates a digital signature sheet (in step SP 17) in which a digital signature has been applied to the received trial characters by the private key, and sends it (in step SP18) to the encryption module 23 of the user terminal 4.

Conversely, when the CPU 46 confirms (in step SP15) from the received result of authentication that the IC card 8 has not been successfully authenticated, the CPU 46 again receives the user ID, generates new common-key-encrypted information by using the common key corresponding to the user ID, and sends it to the IC card 8. The CPU 46 again receives the result of authentication from the IC card 8.

When the encryption module 23 receives the digital signature sheet from the security server 6 (in step SP6), the CPU 10 of the user terminal 4 sends it to the WWW browser 10 through PKCS#11-24 (in step SP7). Then, the CPU 10 sends the received digital signature sheet to the WWW server 3 as the acknowledgement of the authentication request (in step SP8).

When the WWW server 3 receives the digital signature sheet, the WWW server 3 decrypts the digital signature by using the public key written into the user certificate received in advance. When the decryption is successfully performed, it is determined that the legitimate user terminal 4 has requested the electronic priced information.

The WWW server 3 prepares for sending the electronic priced information to the user terminal 4. The WWW server 3 encrypts the electronic priced information by the public key, and sends the encrypted electronic priced information to the user terminal 4.

Figure 12:
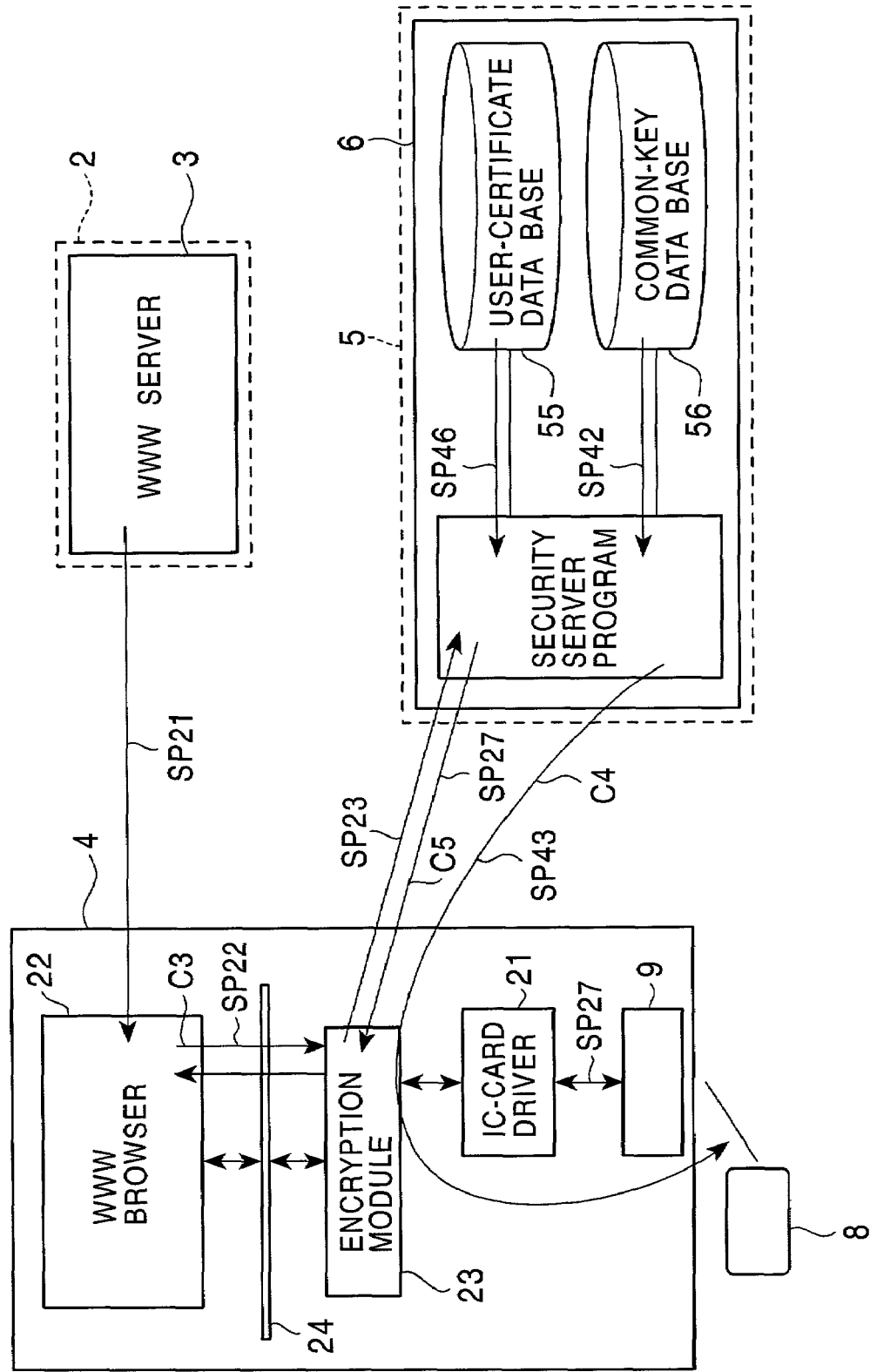
FIG. 12 is an outlined view showing writing.
Figure 13:
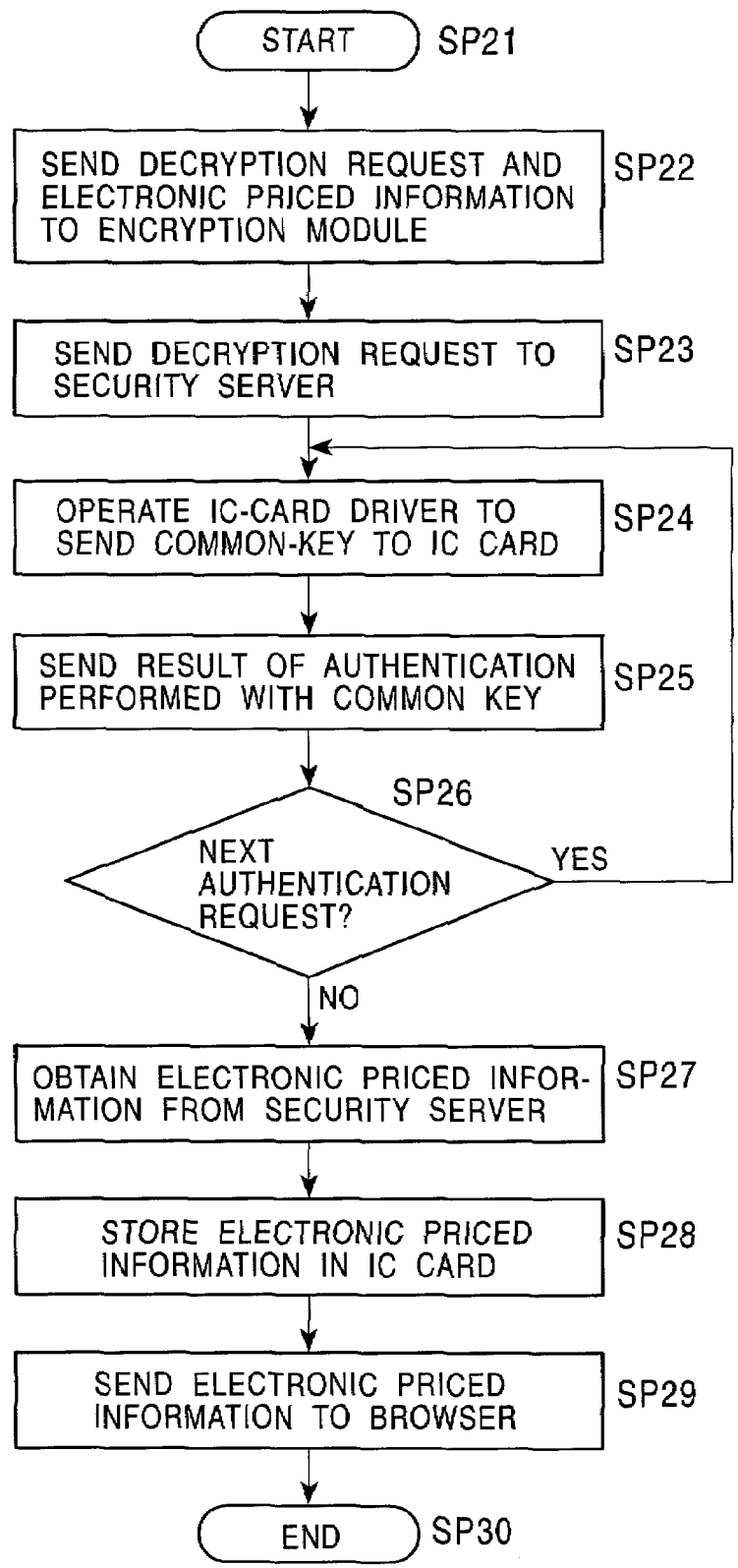
FIG. 13 is a flowchart of a writing procedure achieved by the user terminal.
Figure 14:
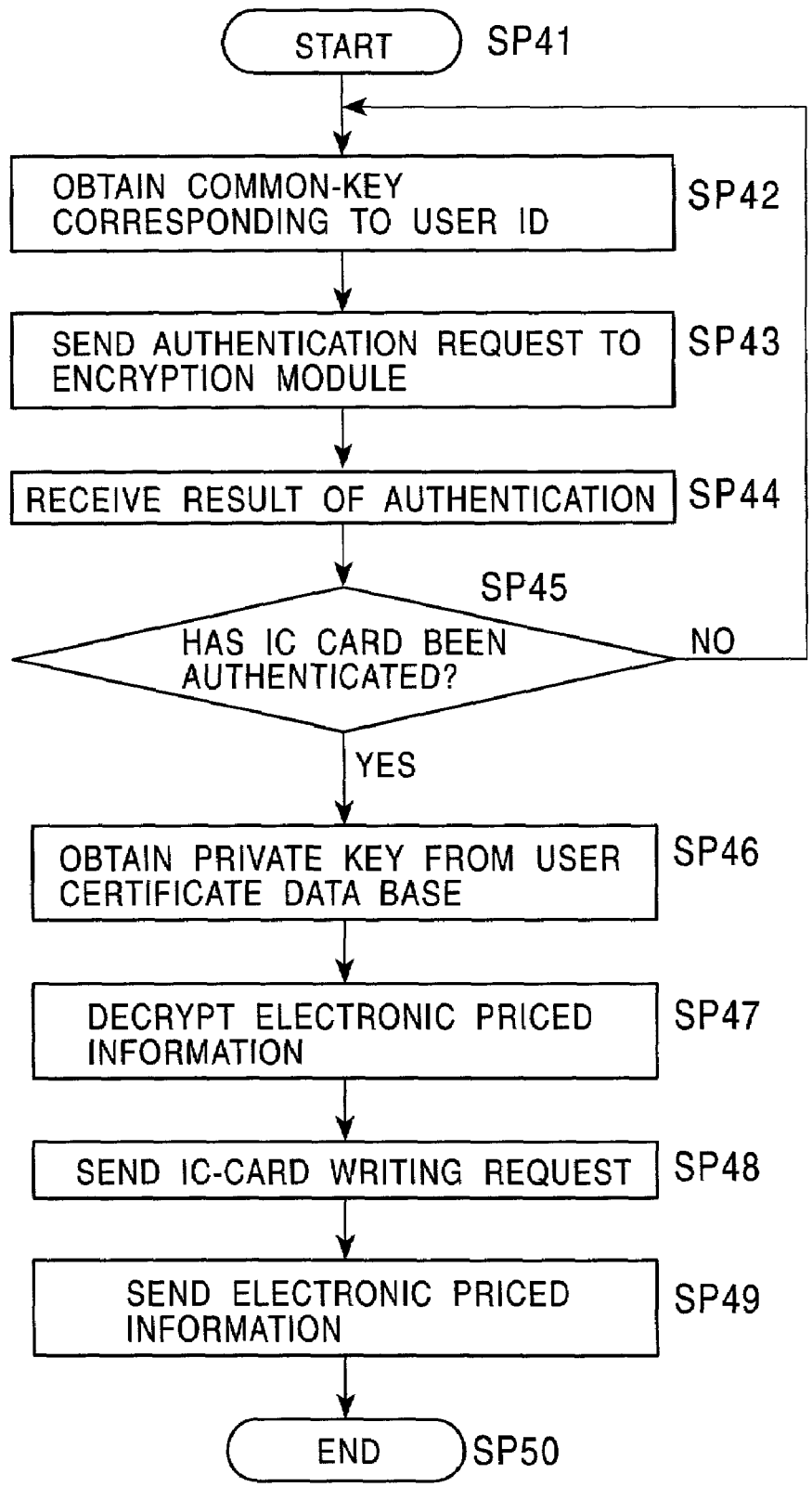
FIG. 14 is a flowchart of a writing procedure achieved by the security server.

In the network system 1, as shown in FIG. 12, the user terminal 4 performs writing according to a writing procedure RT3 shown in FIG. 13 and the security server 6 decrypts the encrypted electronic priced information according to a writing procedure RT4 shown in FIG. 14, so that the user terminal 4 writes the electronic priced information into the IC card 8.

The WWW server 3 sends the encrypted electronic priced information to the WWW browser 22 of the user terminal 4.

When the WWW browser 22 receives the encrypted electronic priced information, the CPU 10 of the user terminal 4 starts the writing procedure RT3 (in step SP21), and sends the received encrypted electronic priced information and a decryption request command C3 to the encryption module 23 (in step SP22).

Then, the CPU 10 sends the user ID read from the IC card 8 through the IC-card reading and writing unit 9, to the security server 6 together with the encrypted electronic priced information and the decryption request command C3 received by the encryption module 23 (in step SP23).

When the CPU 46 of the security server 6 receives the decryption request command C3, the CPU 46 starts the writing procedure RT4 (in step SP41) to authenticate the IC card 8. The CPU 46 reads the common key corresponding to the received user ID from the common-key data base 56 (in step S42), and generates common-key-encrypted information by using the read common key. Then, the CPU 46 sends the common-key-encrypted information and an IC-card authentication request command C4 to the encryption module 23 of the user terminal 4 (in step SP43).

When the encryption module 23 receives the IC-card authentication request command C4 and the common-key-encrypted information, the CPU 10 of the user terminal 4 operates the IC card driver 21 (in step SP24) to send the IC-card authentication request command C4 and the common-key-encrypted information to the IC card 8 through the IC-card reading and writing unit 9.

When the IC card 8 receives the IC-card authentication request command C4, it authenticates (decrypts) the common-key-encrypted information by using a common key stored in the EEPROM 31 provided therein, and sends the result of authentication to the security server 6 through the encryption module 23 (in step SP25).

The CPU 46 of the security server 6 receives the result of authentication sent from the encryption module 23 (in step SP44). When the CPU 46 confirms (in step SP45) from the result of authentication that the IC card 8 has been successfully authenticated, it obtains the private key corresponding to the user ID from the user-certificate data base 55 (FIG. 6) (in step SP46), and decrypts the encrypted electronic priced information by using the private key (in step SP47) to generate the electronic priced information.

Then, the CPU 46 encrypts the generated electronic priced information by using a common key read from the common-key data base 56 to generate common-key-encrypted electronic priced information.

When the CPU 46 confirms (in step SP45) from the received result of authentication that the IC card 8 has not been successfully authenticated, it receives the user ID from the user terminal 4, applies authentication to the common key corresponding to the user ID within the IC card 8, and receives the result of authentication.

When the encryption module 23 receives a writing request command C5 and the common-key-encrypted electronic priced information from the security server 6 (in step SP27), the CPU 10 of the user terminal 4 sends the common-key-encrypted electronic priced information to the IC card 8 through the IC-card reading and writing unit 9.

The CPU 27 of the IC card 8 decrypts the received common-key-encrypted electronic priced information by using a common key read from the common-key area 34 of the EEPROM 31, and writes the electronic priced information obtained by decryption into the electronic-priced-information area 33 of the EEPROM 31.

The CPU 10 of the user terminal 4 sends the electronic priced information received by the encryption module 23 to the WWW browser 22. In this way, the WWW browser 22 obtains decrypted electronic priced information from the WWW server 3.

(3) Operations and Advantages in the Present Embodiment

With the foregoing structure, in the network system 1, the security server 6 authenticates the user by the common-key encryption method by using the common key maintained in the IC card 8 which the user carries, in response to a user authentication request sent from the WWW server 3, and performs, only when the user has been authenticated, predetermined processing for making the WWW server 3 authenticate the user by the public-key encryption method.

Therefore, according to the network system 1, since the security server 6 authenticates the user by the common-key encryption method in response to a user authentication request sent from the WWW server 3, and performs, only when the user has been authenticated, predetermined processing for making the WWW server 3 authenticate the user by the public-key encryption method, quickness given by the common-key encryption method and safety given by the public-key encryption method are together provided.

According to the foregoing structure, in the network system 1, since the security server 6 authenticates the user by the common-key encryption method in response to a user authentication request sent from the WWW server 3, and performs, only when the user has been authenticated, predetermined processing for making the WWW server 3 authenticate the user by the public-key encryption method, quickness given by the common-key encryption method and safety given by the public-key encryption method are together provided. Thus, the network system 1 has improved quickness and safety for authentication.

The user terminal is not limited to a personal computer. It may be a mobile communication apparatus, such as a portable telephone, a satellite telephone, a personal handy-phone system (PHS), and a portable information terminal unit. The data holding apparatus is not limited to an IC card. It needs to hold a common key used in the common-key encryption method, but it does not necessarily have a card shape. It is preferred that the data holding apparatus be portable. The data holding apparatus and the user terminal may be integrated. The data holding apparatus may be a mobile communication apparatus in which an IC chip for an IC card is built in. In this case, the mobile communication apparatus may have a browser function for accessing information on the Internet and a reader/writer function for reading and writing an IC card.

(4) Other Embodiments

In the foregoing embodiment, a case has been described in which the IC-card reading and writing unit 9 and IC card 8 send and receive information to and from each other by radio. The present invention is not limited to this case. The IC-card reading and writing unit 9 and the IC card 8 may be physically connected to send and receive information to and from each other.

In the foregoing embodiment, a case has been described in which authentication is first performed between the security server 6 and the IC card 8, and when electronic priced information decrypted by the security server 6 is stored in the IC card 8, authentication is again performed between the security server 6 and the IC card 8 and then the electronic priced information is stored in the IC card 8. The present invention is not limited to this case. Until a connection made between the security server 6 and the IC card 8 is broken, authentication may be performed only once between the security server 6 and the IC card 8.

In the foregoing embodiment, a case has been described in which, when the user terminal 4 sends a request for authentication to be performed with a common key to the security server 6, the IC card 8 is authenticated. The present invention is not limited to this case. The IC card 8 may be authenticated in advance when the user terminal 4 is connected to the Internet and then to the security server 6.

In the foregoing embodiment, a case has been described in which electronic priced information such as electronic money and commuter-pass information is handled. The present invention is not limited to this case. Free information such as free software may be handled.

In the foregoing embodiment, a case has been described in which electronic money and commuter-pass information are handled as electronic priced information. The present invention is not limited to this case. Music information and book information may be handled as electronic priced information.

In the foregoing embodiment, a case has been described in which an IC card is used as an information holding medium. The present invention is not limited to this case. A medium having a calculation function and a memory function can be used.

In the foregoing embodiment, a case has been described in which encrypted information generated by the security server 6 by using a common key is decrypted by the IC card 8 to authenticate the user. The present invention is not limited to this case. Encrypted information generated by the IC card 8 by using a common key may be decrypted by the security server 6 to authenticate the user.

Although the present invention has been described with reference to specific embodiments, those of skill in the art will recognize that changes may be made thereto without departing from the spirit and scope of the invention as set forth in the hereafter appended claims.

We claim as our invention:

1. A user authentication system, comprising:
    a data holding medium for holding a common key corresponding to a user, used in a common-key encryption method for authentication between the data holding medium held by the user and an authentication apparatus;
    said authentication apparatus for holding the common key used in the common-key encryption method and a private key corresponding to the user used in a public-key encryption method for authentication between the data holding medium and a server to perform a service to the user; and
    an information processing apparatus connected to the authentication apparatus in an always-communicable manner and provided with a function for performing authentication by the public-key encryption method;
    wherein said authentication apparatus is configured to receive a first data item, wherein the first data item is associated with a first authentication request from said information processing apparatus, and wherein said authentication apparatus is configured to authenticate the data holding medium by using the common key in response to the first authentication request;
    wherein said authentication apparatus is further configured to encrypt, only if the data holding medium is authenticated in response to the first authentication request, the first data item using the private key associated with the user and to send the encrypted first data item to the information processing apparatus;
    wherein said information processing apparatus is configured to decrypt the encrypted first data item using a public key associated with the user and to ensure that the decryption is successfully performed;
    wherein the authentication apparatus performs authentication, authenticating the data holding medium by using the common key used in the common-key encryption method for the user held by the data holding medium, wherein the additional authentication request is sent only if the decryption is successfully performed, and
    wherein, only when the user has been authenticated in response to the additional authentication request, the authentication apparatus performs processing, using the private key corresponding to the user, to decrypt transaction information sent from the information processing apparatus to the data holding medium,
    wherein transaction information encrypted by the public-key encryption method, which is sent from the information processing apparatus and forwarded to the authentication apparatus, is decrypted by the authentication apparatus using the private key corresponding to the user so as to obtain decrypted transaction information;
    wherein the decrypted transaction information is encrypted by the authentication apparatus using the common key; and
    wherein the obtained common key encrypted transaction information is sent to the data holding medium for decryption and storage.

2. An authentication system as claimed in claim 1, wherein the data holding medium is portable.

3. An authentication system as claimed in claim 1, wherein the information processing apparatus is a mobile communication apparatus.

4. An authentication system as claimed in claim 1, wherein the data holding medium and the information processing apparatus are integrated as a unit.

5. A user authentication method for a user who carries a data holding apparatus for holding a common key of a user, used in a common-key encryption method for authentication of the data holding apparatus held by the user and an authentication apparatus for authentication between the data holding apparatus and a server to perform a service to the user, the method comprising the steps of:
    authenticating the data holding apparatus of the user by the common-key encryption method by using the common key held by the data holding apparatus in response to an authentication request from the server;
    receiving a first data item, wherein the first data item is associated with the authentication request from the server;
    performing, only when the data holding apparatus of the user has been authenticated, processing for authenticating the data holding apparatus of the user by a public-key encryption method, wherein the processing includes encrypting the first data item using a private-key of the user and sending the encrypted first data item to the server, wherein the server decrypts the encrypted first data item using a public-key of the user and ensures that the decryption is successfully performed;

receiving a second data item, wherein the second data item is encrypted by the server using the public-key of the user;

decrypting the second data item using the private-key of the user;

encrypting the decrypted second data item using the common key; and sending the result of encrypting the decrypted second data item to the data holding apparatus for decryption and storage.

6. A user authentication method as claimed in claim 5, wherein the data holding medium is portable.

7. A user authentication method as claimed in claim 5, wherein the user authentication request is sent from an information processing apparatus.

8. A user authentication method as claimed in claim 7, wherein the information processing apparatus and the data holding apparatus are integrated as a unit.

9. A user authentication method as claimed in claim 7, wherein the information processing apparatus has a communication function.

10. A user authentication method as claimed in claim 9, wherein the data holding apparatus is an IC card.

11. A user authentication method as claimed in claim 10, wherein the information processing apparatus has a communication function, a browser function for accessing information on the Internet, and a reader and writer function for reading and writing the IC card.

12. A user authentication method as claimed in claim 5, wherein the data holding apparatus is an IC card.

13. An authentication method, comprising the steps of:

holding a common key corresponding to a user used in a common-key encryption method for authentication between a data holding apparatus held by the user and an authentication apparatus, and a private key used in a public-key encryption method for authentication between the data holding apparatus and a server to perform a service to the user;

receiving a first data item, wherein the first data item is associated with a first authentication request from the server;

performing, only when the data holding apparatus of the user has been authenticated in response to the first authentication request, processing for authenticating the data holding apparatus of the user by a public-key encryption method, wherein the processing includes encrypting the first data item using a private-key of the user and sending the encrypted first data item to the server, wherein the server decrypts the encrypted first data item using a public-key of the user—and ensures that the decryption is successfully performed;

authenticating, the data holding apparatus by using the held common key used in the common-key encryption method for the user; and performing, only when the data holding apparatus has been authenticated in response to the additional authentication request in the authentication step, processing, using the private key corresponding to the user, to decrypt transaction information sent from the information processing apparatus to the data holding apparatus by the public-key encryption method, wherein transaction information encrypted by the public-key encryption method, which is sent from the server and forwarded to the authentication apparatus, is decrypted by an authentication device using the private key corresponding to the user so as to obtain decrypted transaction information;

wherein the decrypted transaction information is encrypted using the common key; and wherein the obtained common key encrypted transaction information is sent to the data holding apparatus for decryption and storage.

14. An authentication apparatus, comprising:

a holder for holding a common key corresponding to a user, used in a common-key encryption method for authentication between a data holding medium held by the user and an authentication apparatus, and a private key used in a public-key encryption method for authentication between the data holding medium and a server to perform a service to the user;

an authenticating device configured to receive a first data item, wherein the first data item is associated with a first authentication request from said server, and wherein said authenticating device is configured to authenticate the data holding medium by using the common key in response to the first authentication request;

wherein said authenticating device is further configured to encrypt, only if the data holding medium is authenticated in response to the first authentication request, the first data item using the private key associated with the user and to send the encrypted first data item to the server;

wherein said server is configured to decrypt the encrypted first data item using a public key associated with the user and to ensure that the decryption is successfully performed;

wherein said authenticating device is further configured for, in response to an additional authentication request, authenticating the data holding medium by using the common key used in common-key encryption method for the user, wherein the additional authentication request is sent only if the decryption is successfully performed, and wherein said authenticating device is further configured for, only when the data holding medium has been authenticated in response to the additional authentication request by using the common keys, performing, using the private key corresponding to the user, a processing for decryption between the data holding medium and the server, wherein transaction information encrypted by the public-key encryption method, which is sent from the server and forwarded to the authentication apparatus, is decrypted by the authentication device using the private key corresponding to the user so as to obtain decrypted transaction information;

wherein the decrypted transaction information is encrypted using the common key; and wherein the obtained common key encrypted transaction information is sent to the data holding medium for decryption and storage.

15. An authentication apparatus as claimed in claim 14, wherein the authentication apparatus has a private key used in the public-key encryption method.

16. An authentication apparatus as claimed in claim 14, wherein the data holding medium is an IC card.

17. An authentication apparatus as claimed in claim 16, wherein the information processing apparatus has a reader and writer function for reading and writing the IC card.

18. An authentication apparatus as claimed in claim 14, wherein the data holding medium is integrated with the information processing apparatus as a unit.

19. An authentication apparatus as claimed in claim 14, wherein the information processing apparatus is a mobile communication apparatus.

20. An authentication apparatus as claimed in claim 19, wherein the information processing apparatus has a communication function, and a browser function for accessing information on the Internet.

21. A user authentication system, comprising:
a data holding medium for holding a common key associated with a user;
a server for sending a plurality of authentication requests to perform a service to the user; and
an authentication apparatus comprising,
a holding means for holding the common key corresponding to the user used in a common-key encryption method for authentication between a data holding medium held by the user and the authentication apparatus, said holding means holding a private key used in a public-key encryption method for authentication between the data holding medium and the server;
means for authenticating wherein said means for authenticating is configured to receive a first data item, wherein the first data item is associated with a first authentication request from said server, and wherein said means for authenticating is configured to authenticate the data holding medium by using the common key in response to the first authentication request;
wherein said means for authenticating is further configured to encrypt, only if the data holding medium is authenticated in response to the first authentication request, the first data item using the private key associated with the user and to send the encrypted first data item to the server;
wherein said server is configured to decrypt the encrypted first data item using a public key associated with the user and to ensure that the decryption is successfully performed;
wherein the means for authenticating is further configured to authenticate the data holding medium by using the common key used in common-key encryption method for the user in response to an additional authentication request, wherein the additional authentication request is sent only if the decryption is successfully performed,
said authenticating means performing, using the private key corresponding to the user, a processing for decryption between the data holding medium and the server when the data holding medium has been authenticated by using the common keys in response to the additional authentication request,
wherein transaction information encrypted by the public-key encryption method, which is sent from the server and forwarded to the authentication apparatus, is decrypted by the authentication device using the private key corresponding to the user so as to obtain decrypted transaction information;
wherein the decrypted transaction information is encrypted using the common key; and
wherein the obtained common key encrypted transaction information is sent to the data holding medium for decryption and storage.

22. An authentication method between a data holding medium and a server by an authentication apparatus, said data holding medium holding a common key corresponding to a user, used in a common-key encryption method, wherein said authentication apparatus holds the common key and a private key used in a public-key encryption method, the authentication method comprising the steps of:
receiving a first data item, wherein the first data item is associated with a first authentication request from the server;
performing, only when the data holding medium has been authenticated in response to the first authentication request, processing for authenticating the data holding medium by a public-key encryption method, wherein the processing includes encrypting the first data item using a private-key of the user and sending the encrypted first data item to the server, wherein the server decrypts the encrypted first data item using a public-key of the user and ensures that the decryption is successfully performed;
authenticating, in response to an additional authentication request sent, the data holding medium by using the common key used in common-key encryption method for the user held by the data holding medium; and
performing a processing for decryption between the data holding medium and the server by using the private key corresponding to the user when the data holding medium has been authenticated by using the common keys in response to the additional authentication request, wherein transaction information encrypted by the public-key encryption method is sent from the server, forwarded to the authentication apparatus, and decrypted by the authentication device using the private key corresponding to the user so as to obtain decrypted transaction information;
wherein the decrypted transaction information is encrypted using the common key; and
wherein the obtained common key encrypted transaction information is sent to the data holding medium for decryption and storage.

23. An authentication apparatus, comprising:
a holding means for holding a common key corresponding to a user, used in a common-key encryption method for authentication between a data holding medium held by the user and the authentication apparatus, said holding means holding a private key used in a public-key encryption method for authentication between the data holding medium and a server to perform a service to the user;
means for authenticating wherein said means for authenticating is configured to receive a first data item, wherein the first data item is associated with a first authentication request from said server, and wherein said means for authenticating is configured to authenticate the data holding medium by using the common key in response to the first authentication request;
wherein said means for authenticating is further configured to encrypt, only if the data holding medium is authenticated in response to the first authentication request, the first data item using the private key associated with the user and to send the encrypted first data item to the server;

wherein said server is configured to decrypt the encrypted first data item using a public key associated with the user and to ensure that the decryption is successfully performed;

wherein the means for authenticating is further configured to authenticate the data holding medium in response to an additional authentication request by using the common key used in common-key encryption method for the user held by the data holding medium, wherein the additional authentication request is sent only if the decryption is successfully performed, wherein the means for authenticating is configured and for, only when the data holding medium has been authenticated, by using the common keys, in response to the additional authentication request, the means for authenticating being further configured for performing a processing for decryption between the data holding medium and the server by using the private key corresponding to the user when the data holding medium has been authenticated by using the common keys, wherein, as part of the means for authenticating performing the processing, transaction information encrypted by the public-key encryption method is sent from the server, forwarded to the authentication apparatus, and decrypted by the authentication device using the private key corresponding to the user so as to obtain decrypted transaction information;

wherein the decrypted transaction information is encrypted using the common key; and wherein the obtained common key encrypted transaction information is sent to the data holding medium for decryption and storage.

* * * * *